L. J. STEPHENSON.
MOTOR VEHICLE.
APPLICATION FILED JUNE 10, 1918.

1,410,276.

Patented Mar. 21, 1922.
4 SHEETS—SHEET 1.

Witnesses:

Inventor
Leigh J. Stephenson
By Williams, Bradbury &c.
Attys

L. J. STEPHENSON.
MOTOR VEHICLE.
APPLICATION FILED JUNE 10, 1918.

1,410,276.

Patented Mar. 21, 1922.

UNITED STATES PATENT OFFICE.

LEIGH J. STEPHENSON, OF CHICAGO, ILLINOIS, ASSIGNOR TO WOODS MOTOR VEHICLE COMPANY, OF CHICAGO, ILLINOIS, A CORPORATION OF ILLINOIS.

MOTOR VEHICLE.

1,410,276.   Specification of Letters Patent.   Patented Mar. 21, 1922.

Application filed June 10, 1918. Serial No. 239,285.

*To all whom it may concern:*

Be it known that I, LEIGH J. STEPHENSON, a citizen of the United States, residing at Chicago, in the county of Cook and State of Illinois, have invented a certain new and useful Improvement in Motor Vehicles, of which the following is a full, clear, concise, and exact description, reference being had to the accompanying drawings, forming a part of this specification.

This invention relates to improvements in motor vehicles.

The objects of the invention are:

1st. To provide a four wheel drive motor vehicle in which the power is transmitted to all four wheels without appreciable loss.

2nd. To provide a four wheel drive vehicle in which the rear drive wheels are mechanically connected with the power plant and the front drive wheels are electrically connected with the power plant.

3d. To provide means of the character described for driving a motor vehicle wherein the motors driving the front wheels will automatically assume the proper proportion of the load at starting and at low speeds and automatically reduce the load which they carry as the speed of the vehicle increases.

4th. To provide a power plant for a four wheel drive vehicle comprising a suitable engine and a dynamo in combination with a storage battery, the said dynamo functioning at higher speeds as a generator for charging said battery and at lower speeds as a motor for assisting the engine to drive the vehicle, the storage battery serving as a source of energy for the motors used for driving the front wheels of the vehicle.

5th. To provide novel means and circuits for controlling the operation of the power plant and driving mechanism during the starting, running, braking, and stopping of the vehicle.

6th. To so connect the motors for the front drive wheels that if one of the front wheels tends to spin it will be prevented from spinning by the action of the two motors driving these wheels.

Other objects will appear as the description progresses, reference being had to the accompanying drawings in which.

Figure 6 is a side elevation of the throttle controlling means and a switch mechanism, the function of which will be described later on;

Figure 8 is a side elevation of a speed control switch, the function of which will be referred to later on;

Similar characters of reference refer to similar parts throughout the several views.

The power plant of my improved motor vehicle comprises an internal combustion engine having a suitable driving connection with a compound wound dynamo which is wound to function cumulatively when it is operating as a motor and differentially when it is functioning as a generator. This dynamo is connected by means of suitable circuits, which will be described in detail later on, with a storage battery and at high speeds the voltage of the dynamo is such that it will act as a generator and charge the storage battery, but at lower speeds it will act as a motor and assist the internal combustion engine to drive the motor vehicle. The dynamo is connected by means of a forward and reverse gear transmission with a propeller shaft which drives the rear wheels of the vehicle.

I provide a series wound motor for driving each of the front wheels, these motors being pivotally mounted upon the ends of the forward supporting axle and rigidly connected with the spindle about which the front wheels rotate. The shaft of each motor extends through its spindle and drives the wheel through a suitable planetary reduction gear train. The two motors driving the front wheels are connected in series with each other and connected across the terminals of the dynamo and the storage battery. This connection includes a reverse switch which is so connected with the shift lever of the gear transmission that the direction of rotation of these motors is changed when the transmission is thrown into reverse position. These motors, being series wound, will deliver a large starting torque and are designed to normally deliver their share of the torque required to drive a vehicle at a speed of about four miles per hour. As the speed of the vehicle is increased by the engine the current through these motors decreases, always approaching zero. These motors will not charge the storage battery, this function being performed by the dynamo.

I prefer that the internal combustion engine of my improved power plant should be about two-thirds the size or power of the internal combustion engine which would normally be used for driving the vehicle to which my power plant is attached. The dynamo should be of sufficient size to furnish about two-thirds of the power which it is desired to furnish in addition to that of the engine and the remaining one-third of the power required for driving the motor vehicle at its normal speed of four miles per hour should be divided between the motors for driving the two front wheels. By using a planetary reduction between the motors and the front wheels a very large gear ratio may be obtained which may be used either to reduce the required torque of the front drive motors or to increase the torque available for driving the front wheels.

Referring to the drawings, the reference character 15 indicates in general the chassis of a motor vehicle upon which is suitably mounted an internal combustion engine 16 which is connected with a shaft 17 of the dynamo 18 by means of a suitable clutch 19 which may be operated to detach the internal combustion engine from the dynamo in case the former becomes disabled. This clutch is operated by means of a lever 20 which is positioned beneath the hood of the vehicle. To the rear of the dynamo 18 is a gear transmission 21, which is shown as being of the two speed forward and one speed reverse type. This transmission is connected with the dynamo by means of a friction clutch 22, the structure of which and the means for operating will be later described more in detail. The driven shaft 23 of the transmission is connected with a suitable rear propeller shaft 24 by means of a universal joint 25 and the rear end of the propeller shaft 24 is connected with the differential drive mechanism indicated in general by the reference character 26 by means of a universal joint 27.

Figure 11:
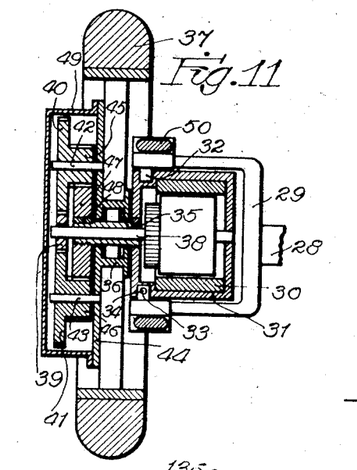
Figure 11 is a transverse section through one of the front drive wheels showing certain features of the construction of the motor and its connection with the drive wheel.

The front supporting axle 28 is provided at each end with a fork 29, as shown in Figure 11. Pivotally mounted on the outer ends of each of these forks is a motor 30 which, as stated above, is series wound. The frame 31 of this motor is pivotally connected with the arms of the fork 29 by means of the pins 32 and 33. The pin 33 is rigidly secured to the frame 31 by means of a second pin 34, or in any other suitable manner. Secured to the outer side of the motor frame is a hollow spindle or trunnion 35 about which the hub 36 of the wheel 37 rotates. The shaft 38 of the motor extends through the trunnion 35 and has keyed to its outer end the pinion 39 which meshes on opposite sides with the gears 40 and 41, respectively. These gears 40 and 41 are rotatably mounted upon stud shafts 42 and 43, respectively, which are secured in a flange-like extension 44 of the hub 36. This extension 44 is secured to the spokes of the wheel in any desired manner. The gears 40 and 41 have formed integrally therewith the pinions 45 and 46, respectively, which engage with opposite sides of the gear 47. The gear 47 is rigidly secured to the outer end of the spindle 35 as by means of screw threads and a key 48. A casing 49 surrounds the planetary gear train described above and is intended to receive a suitable lubricant for this gear train.

Figure 1:
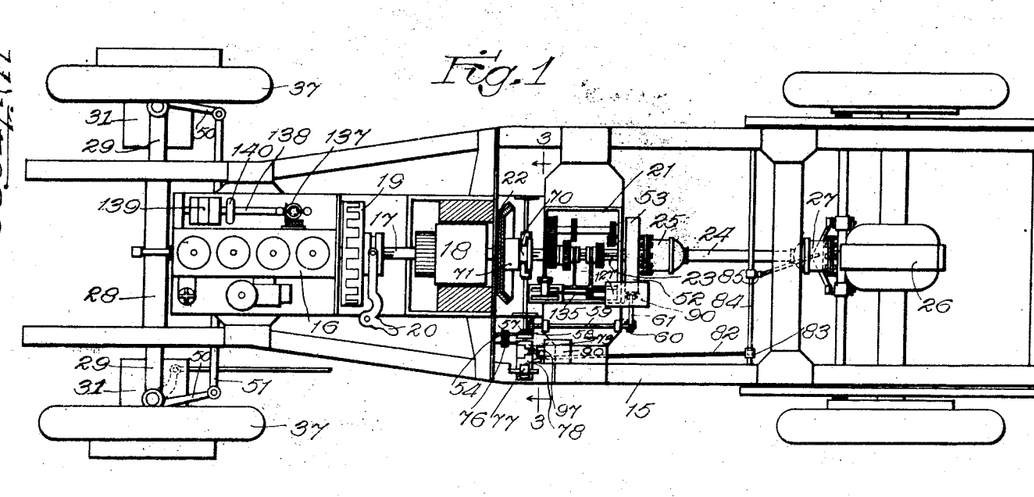
Figure 1 is a plan view of a motor vehicle having my improved means for driving the front and rear wheels, the body and certain other portions of the vehicle being removed to more clearly disclose the relation of the various parts of my driving means.

Secured to the pins 32 and 33 is a steering yoke 50. The steering yokes of the two wheels are connected by a common link 51, as shown in Figure 1, which may be operated to properly steer the front wheels by means of any desired steering mechanism in a well known manner. From the above description it will be clear that when the armatures of the series wound motors rotate in one direction the front wheels will rotate in a forward direction and that when the armatures of these motors rotate in the opposite direction the front wheels will reverse their direction of rotation. The type of gearing which I have illustrated permits of a very large gear reduction, which is desirable for the reason that it permits me to use a comparatively small motor for driving each of the front wheels and at the same time gives a large starting torque. Other types of reduction gearing between these motors and their co-acting drive wheels may, of course, be employed without departing from the spirit of my invention.

Mounted upon the rear end of the driven shaft 23 of the transmission is a brake drum 52 with which the brake strap 53 co-acts. The means for tightening the brake strap 53 comprises a service brake pedal 54 rotatably mounted upon the shaft 55 (see Fig. 4) and secured against longitudinal movement relative to said shaft 55 by means of a set screw 56, the inner end of which engages in an annular groove on the shaft 55 in a well known manner. Formed integrally with the lower end of the brake pedal 54 is a bevel pinion 57 which meshes with a corresponding bevel pinion 58 secured to the shaft 59. The shaft 59 at its rear end is provided with a downwardly extending arm 60 which is connected with the lever of the brake strap by means of a link 61. When the brake pedal 54 is pressed forwardly the service brake is set.

The means for operating the friction clutch between the dynamo and the transmission will now be described.

Figure 5:
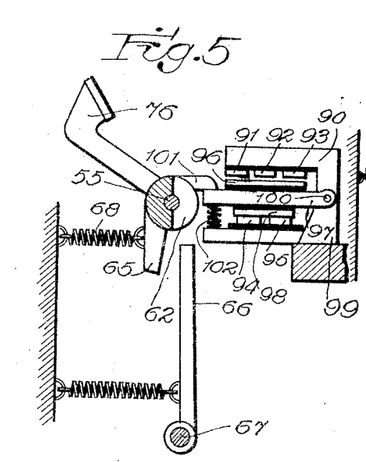
Figure 5 is a section taken on the line 5—5 of Figure 4.

Rotatably mounted upon the shaft 55 is a sleeve 62 having a shoulder 63 at its inner end and a shoulder 64 at its outer end. Projecting downwardly from the sleeve 62 is a lug 65 which when the sleeve 62 is rotated in a counter-clockwise direction, in Figure 5, engages the upper end of the arm 66, the lower end of which is secured to the rock shaft 67. A spring 68 holds the lug 65 in spaced relation to the arm 66. At its inner end the shaft 67 is provided with a pair of pins 68 having inturned ends 69 which engage in an annular groove 70 in the hub 71 of the slidable member 72 of the friction clutch in a well known manner. Rotatably mounted on the shaft 55 at the inner end of the sleeve 62 is a collar 73 which is provided with a shoulder 74 adapted to co-act with the shoulder 63 of the sleeve. The collar 73 is prevented from longitudinal movement relative to the shaft 55 by means of a set screw 75 which engages with an annular groove in the shaft 55 in a well known manner. Secured to the collar 73 is the clutch pedal 76, the forward movement of which brings the shoulder 74 into engagement with the shoulder 63 of the sleeve 62 and rotates the latter sleeve in a counter-clockwise direction, as shown in Figure 5. This counter-clockwise movement of the sleeve 62 is communicated to the rock shaft 67 through the lug 65 and arm 66 to disengage the surfaces of the clutch 22.

The reference character 77 indicates the emergency brake lever, the lower end of which is secured to a collar 78 rotatably mounted upon the shaft 55 and provided with a shoulder 79 which co-acts with the shoulder 64 of the sleeve 62 to positively rotate the sleeve in a counter-clockwise direction, in Figure 5. The collar 78 is prevented from longitudinal movement relative to the shaft 55 by means of a set screw 80 operating in the same manner as the set screws 56 and 75. Secured to the lower side of the collar 78 is an arm 81 which is connected by means of a link 82 with an arm 83 on a rock shaft 84 pivotally mounted at the rear end of the vehicle. A second arm 85 is secured to the shaft 84 at its upper end and connected at its lower end by means of a link 86 with mechanism of a wellknown type for operating the emergency brakes, the construction of which corresponds to the construction of the ordinary service brake and which it is thought unnecessary to describe in detail. It is sufficient to state that when the emergency brake lever 77 is pushed forward the emergency brakes on the rear wheels will be set. I provide a detent 87 for the emergency brake lever 77 which co-acts with a quadrant 88 to hold the emergency brake lever in any of its adjusted positions. The reference character 90 indicates in general a double throw switch comprising three stationary upper contacts 91, 92 and 93 and two lower stationary contacts 94 and 95. The upper stationary contacts are adapted to be connected together by means of a contact 96 carried by the movable element 97 of the switch and the lower stationary contacts 94 and 95 may be connected together by means of a movable contact 98 likewise carried by the element 97 which is pivoted to the supporting member 99, as shown at 100. The free end of the pivoted member 97 projects in the path of a lug 101 secured to the sleeve 62 and is urged upwardly by means of a spring 102. When the clutch pedal 76 is relieved of pressure the spring 68 rotates the sleeve 62 to a position in which the lug 101 causes the pivoted member 97 to move downwardly against the pressure of the spring 102 and thereby cause the contact 98 to connect the two contacts 94 and 95, but when pressure is applied to the clutch pedal 74 the initial movement of this pedal causes the lug 101 to move away from the pivoted member 97, whereupon the spring 102 moves this member upwardly. The contact 96 thereupon connects the three contacts 91, 92 and 93. Further movement of the clutch pedal 76 will cause the lug 65 to engage the arm 66 and thereby cause the clutch surfaces to be disengaged. The functions of the switch 90 will be described later on.

Figures 4, 7:
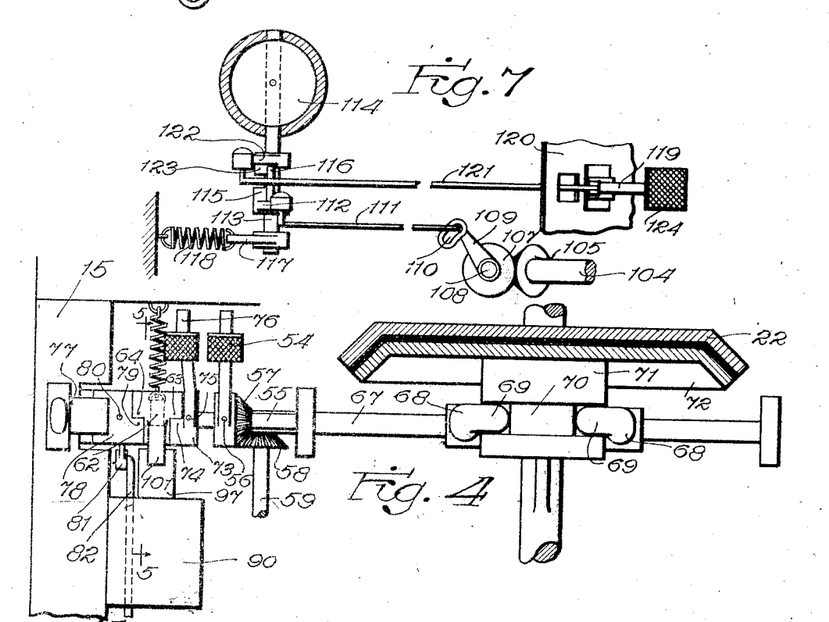
Figure 4 is an enlarged plan view of certain parts of the control mechanism shown in Figure 1, the friction clutch being shown in section.
Figure 7 is a plan view of the structure shown in Figure 6.
Figure 6:
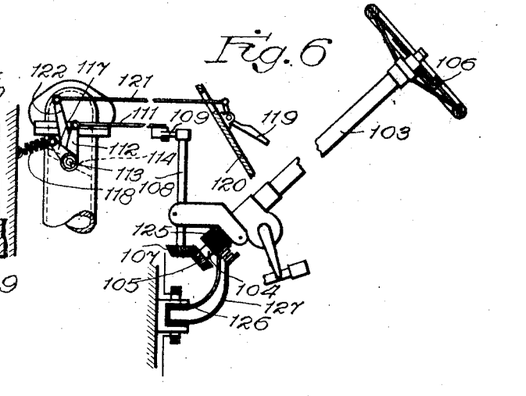

In Figures 6 and 7 I have illustrated the means for controlling the engine throttle. The reference character 103 indicates the steering column, which is hollow and rotatably supports a shaft 104 the lower end of which is provided with a bevel pinion 105 and the upper end of which is provided with a throttle lever 106. The pinion 105 meshes with a similar pinion 107 secured to the lower end of the shaft 108. At its upper end the shaft 108 is provided with an arm 109, the free end of which carries an extension having a slot 110 formed therein. This slot receives the down turned end of the links 111, the opposite end of which is connected with an arm 112 rotatably mounted upon the shaft 113 of the throttle valve 114. This arm 112 is provided with a shoulder 115 which engages with the outer end of the elongated lug 116 formed integrally with the throttle shaft. An arm 117 is secured to the outer end of the shaft 113 and is urged in a counter-clockwise direction, in Figure 6, by means of a spring 118. When the throttle lever 106 is moved in one direction the throttle valve 114 is opened against the tension of the spring 118 and when the throttle lever 106 is moved in the opposite direction the spring 118 closes the throttle. The reference character 119 indicates an accelerator pedal pivotally mounted on the dash 120, or some other suitable support, and connected by means of a link 121 with the upper end of an arm 122 which is likewise rotatably mounted upon the shaft 113 and provided with a shoulder 123 coacting with the inner end of the lug 116. When the pedal 124 is moved toward the dash the valve 114 will be opened against the tension of the spring 118 and when pressure on the pedal 124 is relieved the spring 118 will close the throttle. The two means just described for independently operating the throttle 114 are old and further description thereof appears to be unnecessary.

At the lower end of the shaft 104 I secure an eccentric 125, which is formed of insulating material, and which bears against the upper end of the spring contact 126. This spring contact 126 co-acts with a second spring contact 127 to close a circuit, which will later be described in detail, upon the initial movement of the throttle lever 106. The lost motion connection between the downturned end of the link 111 and the slot 110 is sufficient to permit the closing of the contacts 126 and 127 before the throttle valve of the engine is opened.

Figure 2:
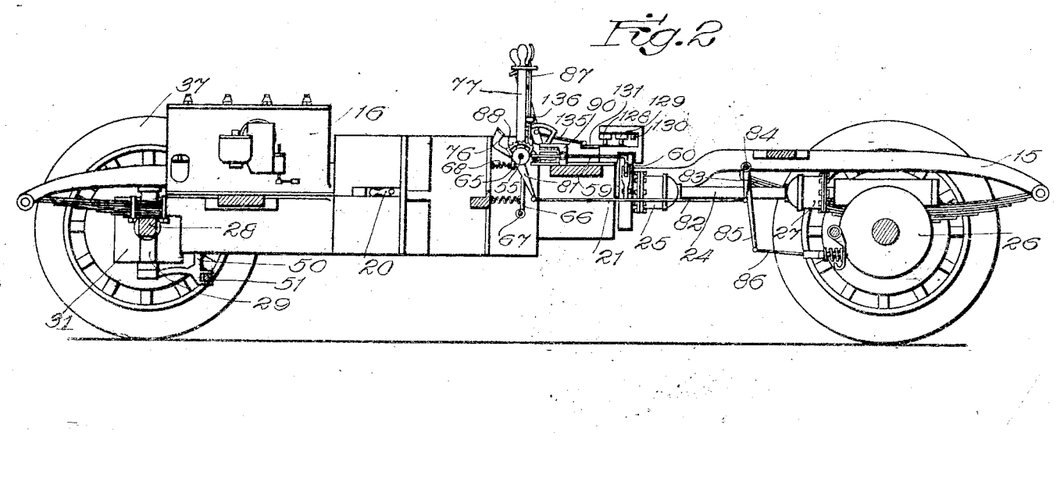
Figure 2 is a side elevation of the structure shown in Figure 1.
Figure 3:
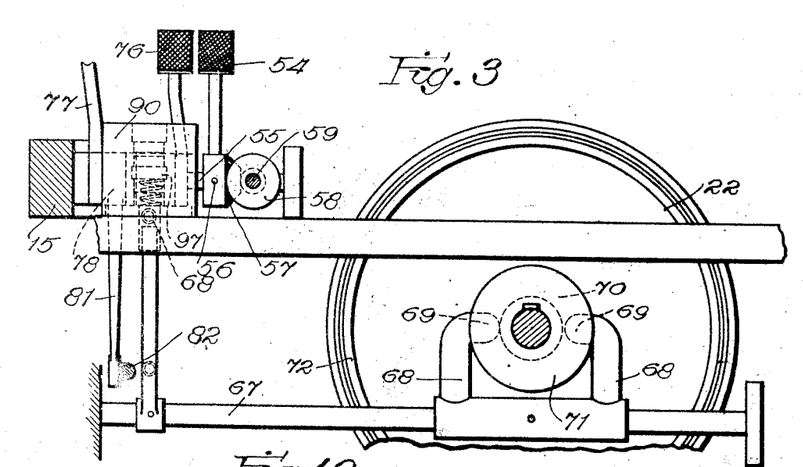
Figure 3 is a transverse section taken on the line 3—3 of Figure 1.
Figure 10:
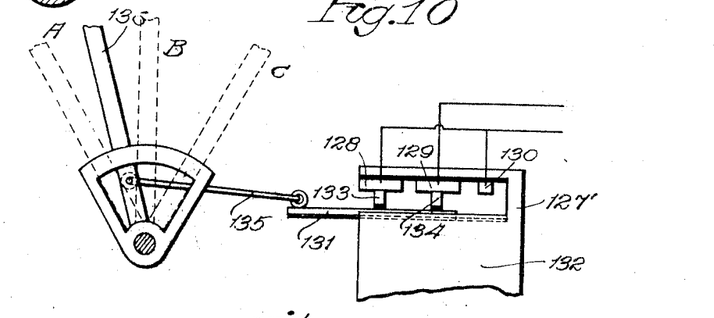
Figure 10 is a side elevation showing the shift lever of the gear transmission and a reversing switch connected therewith.

In Figures 1 and 2 the reference character 127' indicates as a whole a reversing switch, the details of the structure of which are shown in Figure 10. This reversing switch comprises two stationary elongated contacts 128 and 129 and a second shorter contact 130. The contacts 128 and 130 are connected in parallel, as shown in Figure 10. A movable switch member 131 is slidably mounted in a suitable support 132 and carries the two insulated contacts 133 and 134. This movable member is connected by means of the link 135 with the shift lever 136 of the transmission. In Figure 10 this shift lever is shown in full lines in its neutral position. The dotted line positions A, B, and C indicate the high speed forward, low speed forward, and reverse positions of the shift lever 136. As long as the lever 136 is in the positions A, B, or the position shown in full lines in Figure 10, the contacts 133 and 134 will remain in contact with the elongated contacts 128 and 129, respectively, but when the shift lever is moved to the position C the contact 133 will then make contact with the contact 129 and the contact 134 will make contact with the contact 130, thereby reversing the direction of the flow of current through the circuit with which these contacts are connected.

Figure 8:
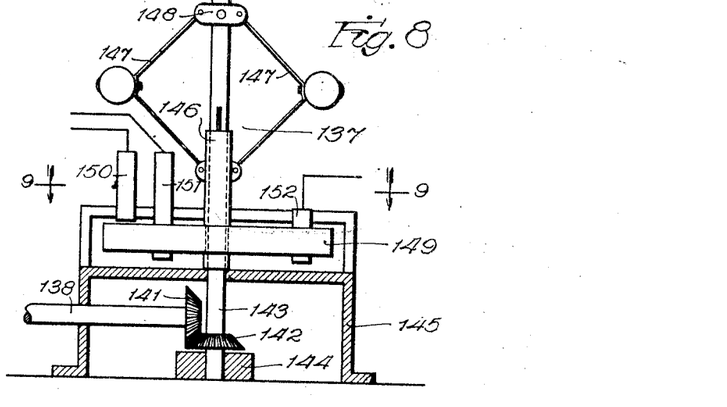
Figure 9:
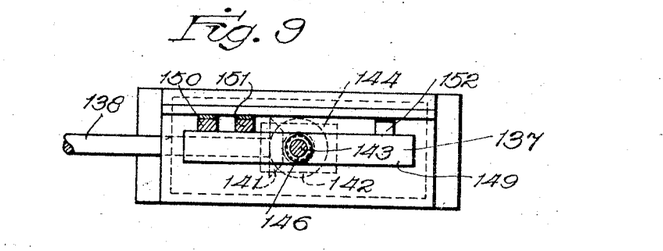
Figure 9 is a plan view of the switch shown in Figure 8, taken on the line 9—9 of Figure 8.

Referring to Figure 1, the reference character 137 indicates as a whole a speed control switch driven from the shaft 138. This shaft 138 is preferably driven from the timing gears, not shown, of the internal combustion engine in a wellknown manner and may also drive the magneto 139 and the circulation pump 140. By this means the speed control switch 137 will be driven at a speed proportional to the speed of the vehicle. The details of the structure of this switch are shown in Figures 8 and 9. The shaft 138 is provided with a bevel pinion 141 which meshes with a corresponding bevel pinion 142 on the lower end of the shaft 143. The shaft 143 finds suitable bearings in the bearing block 144 and the support 145. Slidably mounted upon the shaft 143 and splined thereto is a sleeve 146 to which is pivotally secured the lower ends of the springs 147 of a fly ball governor, the upper ends of these springs being pivotally secured to the upper end of the shaft 143 by means of a suitable coupling member 148. From the above description it will appear that when the shaft 143 is rotated the sleeve 146 will move upwardly and downwardly on the shaft 143 according to the speed of the vehicle. Rotatably mounted upon the sleeve 146 is a contact bar 149 which is adapted to co-act with the contacts 150, 151, and 152, which are suitably secured to the support 145 and insulated therefrom. From an inspection of Figure 8 is will be seen that at low speeds the contact bar 149 does not connect with the contact 150 and that at high speeds the contact bar 149 will be above the upper end of the contact 152.

Figure 12:
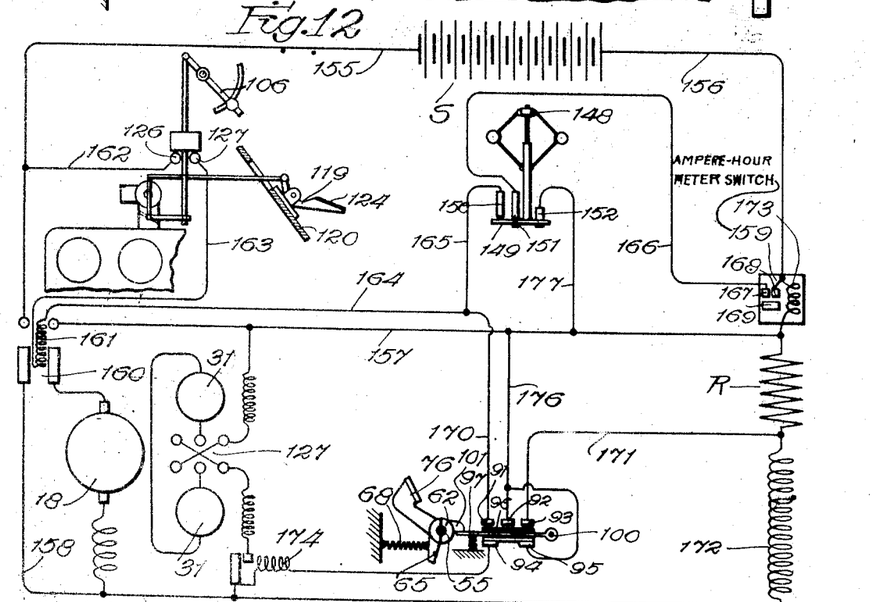
Figure 12 is a diagram of the connections between the dynamo, storage battery, front drive motors, and also showing certain portions of the control mechanism.

Having thus described the mechanical features of my improved four wheel drive power plant and the means for controlling the operation of the same, I will now, by reference to Figure 12, describe the circuits connecting the various electrical apparatus and the means for controlling these circuits and their mode of operation.

As shown in this figure the storage battery S is connected with the dynamo 18 by a circuit comprising the conductors 155, 156, 157, and 158, the ampere hour meter switch 159, and the solenoid operated switch indicated as a whole by the reference character 160. The solenoid 161 of the solenoid operated switch 160 is connected across the storage battery by a circuit including the conductor 162, the spring contacts 126 and 127, conductors 163, 164, and 165, contacts 150, 149, 151, conductor 166, and contacts 167, 168, and 169 of the ampere hour meter switch 159. The ampere hour meter switch 159 is of a wellknown construction in which the contacts 167 and 168 are connected when a certain predetermined amount of current has been delivered from the storage battery; that is, when the storage battery has been discharged to a certain degree and which are disengaged when a certain predetermined amount of current has flowed in an opposite direction from the dynamo acting as a generator to charge the battery S. From the above description it will be clear that when the contacts 150 and 151 are bridged by the contact 149 and when the contacts 167 and 168 are connected by the contact 169 if the throttle lever 106 is then moved to close the spring contacts 126 and 127 the solenoid 161 will be energized and the switch 160 closed.

The contacts 149 and 150 are so arranged relative to each other that they will not make contact until the engine is operating at its idling speed or slightly above this speed. When it is desired to start the engine it is, therefore, necessary to provide another circuit for closing the circuit through the solenoid 161 in order to close the switch 160 to connect the storage battery with the dynamo, it, of course, being understood that the engine is cranked by causing the dynamo to function as a motor. This circuit is closed by depressing the clutch pedal 76 and operating the throttle lever 106 to close the contacts 126 and 127, whereupon current flows from the storage battery S through the conductors 155, 162, the contacts 126, 127, conductor 163, solenoid 161, conductors 164, 170, contacts 91, 96, 92, conductors 176 and 157, the coil 173 of the ampere hour meter switch, and the conductor 156 back to the storage battery S, thereby energizing the solenoid 161 and closing the switch 160. By the means just described the operator is enabled to energize the main switch 160 so as to close the same and start the engine with the dynamo 18 functioning as a motor. The vehicle is then started by easing the clutch pedal 76 back to its normal position, whereby the clutch is thrown in and the rear propeller shaft connected with the engine. At the same time that the clutch is thrown in the lug 101 on the sleeve 62 engages the pivoted member 97 and breaks the circuit between the contacts 91 and 92 and at the same time establishes a connection between the contacts 94 and 95, thereby energizing the solenoid operated switch 174 to close the circuit including the two front motors 30, thereby throwing these motors across the terminals of the dynamo and the storage battery. It will, therefore, be seen that at the same time that the clutch is eased into driving position the two motors for the front drive wheels are energized so that they will furnish the proper proportion of the torque for starting the vehicle. With these motors thus connected across the terminals of the storage battery when the shift lever 136 is thrown into reverse position the reverse switch 127' is operated to reverse the direction of flow of current through the motors and thereby cause them to rotate in the reverse direction.

After the engine is started the speed of the vehicle is controlled either by the throttle lever 106 or by the accelerator pedal 119. By opening the throttle the speed of the vehicle is, of course, increased and by closing the throttle decreased. The ordinary braking is dynamically performed by pressing down the clutch pedal 76 whereby the contact 96 is caused to close the circuit between the contacts 92 and 93 thereby connecting the conductors 171 and 176 and short-circuiting the resistance R in the shunt field circuit at the same time the throttle is closed either by the throttle lever 106 or the accelerator pedal. The driving power thus being removed from the dynamo the energy absorbed from the dynamo in charging the batteries quickly causes a reduction in the speed of the vehicle. This effect is accelerated by short-circuiting the resistance R because by so doing the field of the dynamo is increased, thereby increasing the voltage of the dynamo and in a proportional degree increasing the energy delivered to the storage batteries which must be furnished by the momentum of the vehicle. The vehicle is brought to a complete stop by depressing the pedal 76 far enough to disconnect the clutch and by use of the service brake.

From an inspection of Figures 8 and 12 it will be noted that the contact 152 is not as high as either the contact 150 or the contact 151. The height of this contact 152 is such that when the vehicle is running at a certain predetermined speed, say seven miles per hour, the contact 149 will be above the upper end of the contact 152, but the contact 149, when the engine is running below this speed will complete a circuit through the conductor 162, contacts 126 and 127, conductor 163, solenoid 161, conductors 164 and 165, contacts 150, 149, and 152, conductor 177 to conductor 157, thereby short-circuiting the contacts of the ampere hour meter switch 159, thereby making it certain that the main switch will always be closed below this speed and that the power of the front motors as well as that of the main motor is automatically available in a hard pull. This also entirely eliminates the possibility of stalling the engine if the clutch is engaged too quickly.

With the arrangement of the four wheel drive vehicle as described the power of the engine is transmitted to all four wheels with a minimum loss in energy at the time of starting or in a hard pull. All of the power of the engine is transmitted directly to the rear wheels through a single rear axle gear reduction. The energy for the front motors comes from the battery and is replaced at a time when the power demand on the engine is not so great. This arrangement eliminates a great part of the loss in mechanical transmissions due to numerous bevel gears, universal joints, and other connections customary in mechanical four wheel drives. In a mechanical four wheel drive a portion of the engine power is always being transmitted to the front wheels at considerable loss irrespective of whether or not this driving power is necessary at the front wheels. With a dual power vehicle such as I have described both when the roads are good and the vehicle is up to speed all of the engine power is sent through a single reduction to the rear wheels only and at a very high efficiency. When hard pulling is encountered the power is sent to the front motors, these motors automatically assuming their proper proportion of the load.

While I have described the details of the preferred embodiment of my invention it is to be understood that my invention is not limited to these details, but is capable of other adaptations and modifications within the scope of the appended claims.

Having thus described my invention, what I claim as new and desire to secure by Letters Patent of the United States is:

1. In a motor vehicle having front and rear drive wheels the combination of an internal combustion engine provided with a throttle, a throttle lever and an accelerator pedal for independently actuating said throttle, a compound wound dynamo, driving connections between said engine and said dynamo, a multi-speed forward and reverse gear transmission including a shift lever connected with said dynamo by a clutch, a propeller shaft for driving said rear wheels, the said propeller shaft being driven by said transmission, an emergency brake, a storage battery, a circuit for connecting said dynamo and storage battery comprising a solenoid operated main switch and an ampere hour meter, a speed control switch driven by said engine having contacts opening at speeds below the idling speed of said engine and closed at higher speeds, contacts opened by said ampere hour meter when said storage battery is completely charged and closed when said battery is discharged, contacts connected with said throttle lever to close during the initial movement of said throttle lever, an energizing circuit for the solenoid of said main switch including said ampere hour meter contacts, said speed control switch contacts and the contacts actuated by said throttle lever, a resistance connected in series with the shunt field of said dynamo, a second circuit for energizing said solenoid independently of said ampere hour meter and said speed control switch contacts, a short-circuiting circuit for said resistance, a common switch for opening and closing said second and short-circuiting circuits, means for actuating said clutch to connect and disconnect said dynamo and transmission comprising a clutch pedal, an emergency brake lever, means independently operated by said clutch pedal or said emergency brake lever to first close said common switch and then disconnect said clutch or vice versa, a series wound motor for driving each of said front drive wheels, a circuit for connecting said motors in series with each other and across said storage battery terminals, the said circuit including a switch controlled by said clutch pedal or emergency brake lever for closing said circuit.

2. In a motor vehicle having front and rear drive wheels the combination of an internal combustion engine provided with a throttle, a lever for actuating said throttle, a compound wound dynamo, driving connections between said engine and said dynamo, a forward and reverse gear transmission including a shift lever connected with said dynamo by a clutch, a propeller shaft for driving said rear wheels, the said propeller shaft being driven by said transmission, an emergency brake, a storage battery, a circuit for connecting said dynamo and storage battery comprising a solenoid operated main switch and an ampere hour meter, a speed control switch driven by said engine having contacts opening at speeds below the idling speed of said engine and closed at higher speeds, contacts opened by said ampere hour meter when said storage battery is completely charged and closed when said battery is discharged, contacts connected with said throttle lever to close during the initial movement of said throttle lever, an energizing circuit for the solenoid of said main switch including said ampere hour meter contacts, said speed control switch contacts and the contacts actuated by said throttle lever, a resistance connected in series with the shunt field of said dynamo, a second circuit for energizing said solenoid independently of said ampere hour meter and said speed control switch contacts, a short-circuiting circuit for said resistance, switch mechanism for opening and closing said second and short-circuiting circuits, means for actuating said clutch to connect and disconnect said dynamo and transmission comprising a clutch pedal, an emergency brake lever, means independently operated by said clutch pedal or said emergency brake lever to first close said switch mechanism and then disconnect said clutch or vice versa, a series wound motor for driving each of said front drive wheels, and a circuit for connecting said motors in series with each other and across said storage battery terminals, the said circuit including a switch controlled by said clutch pedal or emergency brake lever for closing said circuit.

3. In a motor vehicle having front and rear drive wheels the combination of an internal combustion engine provided with a throttle, a lever for actuating said throttle, a compound wound dynamo, driving connections between said engine and said dynamo, a forward and reverse gear transmission including a shift lever connected with said dynamo by a clutch, a propeller shaft for driving said rear wheels, the said propeller shaft being driven by said transmission, a storage battery, a circuit for connecting said dynamo and storage battery comprising a solenoid operated main switch and an ampere hour meter, a speed control switch driven by said engine having contacts opening at speeds below the idling speed of said engine and closed at higher speeds, contacts opened by said ampere hour meter when said storage battery is completely charged and closed when said battery is discharged, contacts connected with said throttle lever to close during the initial movement of said throttle lever, an energizing circuit for the solenoid of said main switch including said ampere hour meter contacts, said speed control switch contacts and the contacts actuated by said throttle lever, a resistance connected in series with the shunt field of said dynamo, a second circuit for energizing said solenoid independently of said ampere hour meter and said speed control switch contacts, a short-circuiting circuit for said resistance, switch mechanism for opening and closing said second and short-circuiting circuits, means for actuating said clutch to connect and disconnect said dynamo and transmission comprising a clutch pedal, means operated by said clutch pedal to first close said switch mechanism and then disconnect said clutch or vice versa, a series wound motor for driving each of said front drive wheels, and a circuit for connecting said motors in series with each other and across said storage battery terminals, the said circuit including a switch controlled by said clutch pedal for closing said circuit.

4. In a motor vehicle having front and rear drive wheels the combination of an internal combustion engine provided with a throttle, a lever for actuating said throttle, a compound wound dynamo, driving connections between said engine and said dynamo, a forward and reverse gear transmission including a shift lever connected with said dynamo by a clutch, a propeller shaft for driving said rear wheels, the said propeller shaft being driven by said transmission, an emergency brake, a storage battery, a circuit for connecting said dynamo and storage battery comprising a solenoid operated main switch and an ampere hour meter, a speed control switch driven by said engine having contacts opening at speeds below the idling speed of said engine and closed at higher speeds, contacts opened by said ampere hour meter when said storage battery is completely charged and closed when said battery is discharged, contacts connected with said throttle lever to close during the initial movement of said throttle lever, an energizing circuit for the solenoid of said main switch including said ampere hour meter contacts, said speed control switch contacts and the contacts actuated by said throttle lever, a resistance connected in series with the shunt field of said dynamo, a second circuit for energizing said solenoid independently of said ampere hour meter and said speed control switch contacts, a short-circuiting circuit for said resistance, switch mechanism for opening and closing said second and short-circuiting circuits, means for actuating said clutch to connect and disconnect said dynamo and transmission comprising an emergency brake lever, means operated by said emergency brake lever to first close said switch mechanism and then disconnect said emergency brake or vice versa, a series wound motor for driving each of said front drive wheels, and a circuit for connecting said motors in series with each other and across said storage battery terminals, the said circuit including a switch controlled by said emergency brake lever for closing said circuit.

5. In a motor vehicle having front and rear drive wheels the combination of an internal combustion engine, a throttle, a lever for actuating said throttle, a dynamo having a shunt winding, driving connections between said dynamo and engine including a clutch, a clutch operating pedal, a forward and reverse gear transmission having a shift lever, driving connections between said rear drive wheels and said transmission, a storage battery, a circuit connecting said dynamo and storage battery comprising a switch controlled by said throttle actuating lever and said clutch pedal, a series motor for driving each of said front drive wheels, a circuit for connecting said motors in series with each other and across the terminals of said storage battery, the said circuit including a reversing switch for reversing the direction of rotation of said motors, and connections between said shift lever and said reversing switch for reversing said motors when said shift lever is thrown into reverse.

6. In a motor vehicle having front and rear drive wheels the combination of an internal combustion engine, a dynamo having a shunt winding, driving connections between said dynamo and engine including a clutch, a clutch operating pedal, a forward and reverse gear transmission having a shift lever, driving connections between said rear drive wheels and said transmission, a storage battery, a circuit connecting said dynamo and storage battery comprising a switch controlled by said clutch pedal, a series motor for driving each of said front drive wheels, a circuit for connecting said motors in series with each other and across the terminals of said storage battery, the said circuit including a reversing switch for reversing the direction of rotation of said motors, and connections between said shift lever and said reversing switch for reversing said motors when said shift lever is thrown into reverse.

7. In a motor vehicle having front and rear drive wheels the combination of an internal combustion engine, a dynamo having a shunt winding, driving connections between said dynamo and engine, a forward and reverse gear transmission having a shift lever, driving connections between said rear drive wheels and said transmission, a storage battery, a circuit connecting said dynamo and storage battery, a series motor for driving each of said front drive wheels, a circuit for connecting said motors in series with each other and across the terminals of said storage battery, the said circuit including a reversing switch for reversing the direction of rotation of said motors, and connections between said switch lever and said reversing switch for reversing said motors when said shift lever is thrown into reverse.

8. In a motor vehicle having front and rear drive wheels the combination of an engine, a dynamo having a shunt winding, driving connections between said engine and said dynamo, a forward and reverse transmission driven from said dynamo, a storage battery, a circuit connecting said storage battery and dynamo, a series wound motor for driving each of said front driving wheels, a circuit for connecting said motors in series with each other and across the terminals of said storage battery, the said circuit including a reversing switch, and means for operating said switch to reverse said motors when said transmission is thrown into reverse.

9. In a motor vehicle having front and rear drive wheels the combination of an engine, a dynamo, driving connections between said engine and said dynamo, a storage battery, a circuit including said dynamo and storage battery, a forward and reverse transmission driven by said dynamo, a motor for driving each of said front drive wheels, and means for connecting said motors with said storage battery so as to rotate in one direction when said transmission is thrown forward and in the reverse direction when said transmission is thrown in reverse.

10. In a motor vehicle having front and rear drive wheels the combination of an engine, a dynamo, driving connections between said engine and dynamo, a storage battery, a circuit connecting said dynamo and battery including a solenoid operated main switch and an ampere hour meter, switch contacts controlled by said ampere hour meter, a circuit for energizing the solenoid of said main switch including said switch contacts, and means controlled by the speed of the vehicle for short-circuiting said contacts when the vehicle is traveling below a certain predetermined speed and comprising means for automatically opening and closing said circuit as said battery is charged and discharged, and means controlled by the speed of the vehicle for automatically rendering said last named means operative and inoperative.

11. In a motor vehicle having front and rear drive wheels the combination of an engine, a dynamo, driving connections between said engine and dynamo, a storage battery, a circuit connecting said dynamo and battery and comprising means for automatically opening and closing said circuit as said battery is charged and discharged, and means controlled by the speed of the vehicle for automatically rendering said last named means operative and inoperative.

12. A vehicle comprising a front and a rear drive wheel, an engine, a dynamo, driving connections between said engine and said dynamo, a storage battery, electrical connections between said dynamo and said storage battery, mechanical connections between said dynamo and one of said drive wheels, an electric motor for driving the other of said drive wheels while said first named drive wheel is being driven from said engine, and electrical connections between said motor and said storage battery.

13. In a motor vehicle having a forward and a rear drive wheel the combination of an engine, a dynamo, driving connection between said engine and said dynamo, driving connection between the unit consisting of said dynamo and said engine and one of said drive wheels, a storage battery, a circuit connecting said dynamo and said storage battery, a motor for driving the other of said drive wheels, a circuit connecting said motor and said storage battery, means for controlling the reversal of the direction of rotation of both drive wheels, means for controlling the charging of said battery, and means controlled by the speed of the vehicle for making the last named means operative or inoperative.

14. In a motor vehicle having a forward and a rear drive wheel the combination of an engine, a dynamo, driving connection between said engine and said dynamo, driving connection between the unit consisting of said dynamo and said engine and one of said drive wheels, a storage battery, a circuit connecting said dynamo and said storage battery, a motor for driving the other of said drive wheels, a circuit connecting said motor and said storage battery, means for controlling the reversal of the direction of rotation of both drive wheels, and means for controlling the charging of said battery.

In witness whereof, I hereunto subscribe my name this 5th day of June, A. D. 1918.

LEIGH J. STEPHENSON.

Witnesses:
 EARL F. PIERCE,
 MARY A. COOK.